US009607460B2

(12) United States Patent
Yamane et al.

(10) Patent No.: US 9,607,460 B2
(45) Date of Patent: Mar. 28, 2017

(54) SMART ENTRY SYSTEM

(71) Applicant: HONDA MOTOR CO., LTD., Tokyo (JP)

(72) Inventors: Katsuyasu Yamane, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 14/466,189

(22) Filed: Aug. 22, 2014

(65) Prior Publication Data

US 2015/0054618 A1 Feb. 26, 2015

(30) Foreign Application Priority Data

Aug. 26, 2013 (JP) ................................ 2013-174338

(51) Int. Cl.
*G07C 9/00* (2006.01)

(52) U.S. Cl.
CPC .................... *G07C 9/00309* (2013.01); *G07C 2009/00333* (2013.01); *G07C 2009/00793* (2013.01); *G07C 2209/63* (2013.01); *Y02B 60/50* (2013.01)

(58) Field of Classification Search
CPC ...... G07C 9/00309; G07C 2009/00333; G07C 2009/00341; G07C 2009/00357;
(Continued)

(56) References Cited

U.S. PATENT DOCUMENTS 6,281,599 B1 * 8/2001 Murakami .............. B60R 25/24 180/287
6,552,649 B1 * 4/2003 Okada ................. B60R 25/2036 307/10.1
(Continued)

FOREIGN PATENT DOCUMENTS

DE 101 16 870 10/2001
DE 10 2006 013 202 10/2006
(Continued)

OTHER PUBLICATIONS

Japanese Office Action dated May 12, 2015, partial English translation included.
(Continued)

*Primary Examiner* — Thomas Alunkal
(74) *Attorney, Agent, or Firm* — Rankin, Hill & Clark LLP

(57) ABSTRACT

A smart entry system comprises a communication section and a control device. Upon determination that a mobile device has continued to be present within a first transmission area for a predetermined time or over, the control device lowers first transmitter power output of a first electromagnetic wave to be transmitted from the communication section to second transmitter power output of the first electromagnetic wave so that the first transmission area is narrowed to a second transmission area until no more response is received from the mobile device. Then, the communication section not only transmits the first electromagnetic wave having the second transmitter power output and generating the second transmission area but also transmits, with a second cyclic period longer than the first cyclic period, a second electromagnetic wave, the second electromagnetic wave has the first transmitter power output and generates the first transmission area which is not narrowed.

9 Claims, 5 Drawing Sheets

(58) Field of Classification Search
CPC ........ G07C 9/00182; G07C 2009/0019; G07C 2009/00634; G07C 2209/63; G07C 2009/00793
USPC ........................ 340/933, 425.5, 426.16, 5.72
See application file for complete search history.

(56) References Cited

U.S. PATENT DOCUMENTS

| | | | | |
|---|---|---|---|---|
| 6,778,065 | B1 * | 8/2004 | Asakura | B60R 25/245 340/12.5 |
| 2003/0095040 | A1 * | 5/2003 | Shimomura | B60R 25/1004 340/426.13 |
| 2004/0095230 | A1 * | 5/2004 | Li | B67D 7/0401 340/426.16 |
| 2004/0227639 | A1 | 11/2004 | Masui | |
| 2004/0249534 | A1 * | 12/2004 | Yamada | B60R 16/03 701/36 |
| 2005/0168322 | A1 * | 8/2005 | Appenrodt | B60R 25/246 340/5.72 |
| 2005/0247088 | A1 * | 11/2005 | Kadouchi | B60R 25/24 70/271 |
| 2006/0077035 | A1 * | 4/2006 | Mamaloukas | G07C 9/00309 340/5.61 |
| 2007/0109093 | A1 * | 5/2007 | Matsubara | G07C 9/00309 340/5.61 |
| 2010/0114488 | A1 * | 5/2010 | Khamharn | B60R 25/102 701/300 |
| 2010/0304690 | A1 * | 12/2010 | Proefke | B60R 25/403 455/69 |
| 2014/0097671 | A1 * | 4/2014 | Nakamura | B60L 3/04 307/9.1 |
| 2014/0288774 | A1 * | 9/2014 | Morita | G01C 21/26 701/36 |

FOREIGN PATENT DOCUMENTS

| | | |
|---|---|---|
| DE | 10 2006 058 856 | 6/2008 |
| DE | 10 2008 008 089 | 8/2009 |
| JP | 2001-295524 | 10/2001 |
| JP | 2003-102068 | 4/2003 |
| JP | 2004-084406 | 3/2004 |
| JP | 2004-339700 | 12/2004 |
| JP | 2008-014095 | 1/2008 |

OTHER PUBLICATIONS

Japanese Office Action dated Jan. 5, 2016, partial English translation included.

German Office Action dated Jul. 26, 2016, Application No. 10 2014 216 838.4, English translation included.

* cited by examiner

SMART ENTRY SYSTEM

CROSS-REFERENCE TO RELATED APPLICATION

This application claims priority to and the full benefit of Japanese Patent Application No. 2013-174338 filed Aug. 26, 2013 and incorporates the Japanese application by reference herein in its entirety.

FIELD OF THE INVENTION

The present invention relates generally to an improvement of smart entry systems for vehicles.

BACKGROUND OF THE INVENTION

Japanese Patent Application Laid-open Publication No. 2008-14095 (hereinafter referred to as "the relevant patent literature") discloses a vehicular keyless apparatus including a mobile device and a vehicle-mounted device. The vehicle-mounted device includes a control section as a control device, and the control section is connected to a communication section having, for example, an LF (Low Frequency) transmission section, a vehicular external antenna output section and antennas. Further, according to the disclosure of the relevant patent literature, once it is determined that the mobile device is currently at a stop within a first search range (first transmission area) set outside of the vehicle via one of the antennas, the control section lowers transmitter power output of electromagnetic waves transmitted from the antennas in such a manner that the above-mentioned first search range is narrowed to a second search range (second transmission area) until no more response is received from the mobile device.

Namely, when a user or passenger having the mobile device with it (i.e., her or him) has no intention to get in the vehicle, the vehicle-mounted device shifts to an electric power saving mode. Then, as the passenger approaches the vehicle, i.e., as the mobile device enters the second search range narrowed from the first search range, the vehicular keyless apparatus can not only unlock the doors of the vehicle but also illuminates a region around the feet of the passenger.

However, after the first search range has been narrowed to the second search range, the passenger having the mobile device with it (her or him) may sometimes move or get away from the vehicle out of the first search range. In such a situation, the vehicular keyless apparatus cannot unlock the doors. Namely, after the first search range has been narrowed to the second search range, the passenger has to approach the vehicle until it enters the second or narrowed search range, in order for the vehicular keyless apparatus to unlock the doors.

SUMMARY OF THE INVENTION

It is an object of the present invention to provide an improved smart entry system for a vehicle which is capable of enhancing user convenience. Other objects of the present invention will become apparent to a person skilled in the art with reference to the following exemplary aspects and preferred embodiments and the accompanying drawings.

This summary can be better understood with reference to first to eighth aspects, for example. In the first aspect, there is provided a smart entry system that detects whether or not a mobile device is present within a first transmission area set outside of a vehicle, which comprises: a communication section that transmits, with a first cyclic period, a first electromagnetic wave, generating the first transmission area, to outside of the vehicle and receives from the mobile device a response to the first electromagnetic wave; and a control device that determines, based on presence/absence of the response from the mobile device, whether the mobile device is present within the first transmission area. Upon determination that the mobile device has continued to be present (i.e., has continued to stay) within the first transmission area for a predetermined time or over, the control device lowers first transmitter power output of the first electromagnetic wave to be transmitted from the communication section to second transmitter power output of the first electromagnetic wave so that the first transmission area is narrowed to a second transmission area until no more response is received from the mobile device. Then, the communication section not only transmits the first electromagnetic wave having the second transmitter power output and generating the second transmission area but also transmits, with a second cyclic period longer than the first cyclic period, a second electromagnetic wave, the second electromagnetic wave has the first transmitter power output and generates the first transmission area which is not narrowed. When no response to the second electromagnetic wave transmitted with the second cyclic period is received from the mobile device, the communication section transmits again, with the first cyclic period, the first electromagnetic wave, the first electromagnetic wave has the first transmitter power output and generates the first transmission area, the first transmitter power output is not lowered and the first transmission area is not narrowed.

According to the first aspect, even after a first transmission area has been narrowed to a second transmission area, it is detected periodically or with a second cyclic period whether or not the mobile device is present within the first transmission area which is not narrowed (hereinafter also referred to as "unnarrowed first transmission area"). If it has been determined that the mobile device is not present within the unnarrowed first transmission area after the narrowing of the first transmission area to the second transmission area, it means that the mobile device has got away (i.e., has been moved away) from the vehicle out of the first transmission area after staying within the first transmission area for a predetermined time or over. In such a situation, the first transmission area need not be narrowed to the second transmission area any longer. Thus, upon determination that the mobile device has entered the reset (set-again) first transmission area, the smart entry system of the invention can unlock doors of the vehicle, for example. Also, upon determination that the mobile device has entered the reset (set-gain) first transmission area, the smart entry system can turn on a light emitting section, such as blinkers or direction indicators, of the vehicle, for example. Therefore, for using the smart entry system, a user need not approach the vehicle until the user enters the second transmission area narrowed from the first transmitter area, and thus, user convenience is enhanced.

In the second aspect depending on the first aspect, the control device stores the second transmitter power output of the first electromagnetic wave, the first electromagnetic wave is transmitted from the communication section and generates the second transmission area narrowed from the first transmitter area. Meanwhile, if it has been determined that the mobile device is present within the unnarrowed first transmission area after the narrowing of the first transmission area to the second transmission area, it means that the mobile device is still present within the first transmission area. In such a situation, the first transmission area need continue to be narrowed to the second transmission area. This is because some users may usually place the mobile device within the first transmission area after getting off the vehicle. According to the second aspect, the second transmitter power output of the first electromagnetic waves, setting the second transmission area, is stored in a storage section of the control device, for example. Thus, in a case where such second transmitter power output is prestored in advance, the smart entry system can first set the second transmission area. Namely, because the second transmission area, rather than the first transmission area, is set as the user gets off the vehicle, there is no need to narrow the first transmission area to the second transmission area. Further, because the second transmission area, rather than the first transmission area, is set as the user gets off the vehicle, there is a low possibility of the mobile device continuing to stay within the second transmission area for a predetermined time or over.

In the third aspect depending on the second aspect, the smart entry system further comprises a position acquisition device that acquires a position of the vehicle. Thus, in accordance with the position of the vehicle acquired by the position acquisition device, the control device sets the first transmitter power output of the first electromagnetic wave to be transmitted from the communication section with the first cyclic period. When storing the second transmitter power output of the first electromagnetic wave transmitted from the communication section and generating the second transmission area, the control device further stores the position of the vehicle as a first position. In a case where the first position is prestored in advance and when the position or a current position of the vehicle matches the first position, the control device sets the second transmitter power output as the first transmitter power output of the first electromagnetic wave to be transmitted from the communication section with the first cyclic period. Meanwhile, some users may basically place the mobile device within the first transmission area after getting off the vehicle. Namely, when such a user parks the vehicle near its (her or his) house, the user may place the mobile device within the first transmission area. When the user parks the vehicle on a parking place other than near its house, on the other hand, the user may keep the mobile device with it (her or him) without continuing to place the mobile device within the first transmission area. Thus, it is preferable that the smart entry system sets or determines the first transmission area in accordance with a place where the user parks the vehicle. According to the third aspect, the smart entry system can use a position of the vehicle. Namely, the control device may store a position of the vehicle as a first position when storing the second transmitter power output of the first electromagnetic waves that set the second transmission area. When a current position of the vehicle matches the prestored first position, i.e. when the user parks, for example, the vehicle near its house, the smart entry system can first set the second transmission area. Because, in this case, the second transmission area rather than the first transmission area is set as the user gets off the vehicle, there is no need for the smart entry system to narrow the first transmission area to the second transmission area.

In the fourth aspect depending on the second or third aspect, the control device stores the second transmitter power output in response to operation information given from an operation section. According to the fourth aspect, the second transmission area can be stored or set as desired by the user. Namely, because some users may place the mobile device within the first transmission area very rarely rather than usually, the control device need not store or set the second transmission area in the absence of operation information given from the operation section.

In the fifth aspect depending on any one of the first to fourth aspects, the smart entry system further comprises a notification section that provides a user with notification information corresponding to the second transmitter power output lowered from the first transmitter power output. According to the fifth aspect, the notification section can provide the user with notification information corresponding to the second transmitter power output, i.e. can inform the user that the first transmission area has been narrowed to the second transmission area after the mobile device was placed within the first transmission area. Particularly, after it is determined that the mobile device has entered the second transmission area narrowed from the first transmission area, the notification section may provide the notification information corresponding to the second transmitter power output. For example, because the notification information is provided to the user next time the user gets in the vehicle, the user can recognize more reliably that the first transmission area has been narrowed to the second transmission area.

In the sixth aspect depending on the first aspect, the smart entry system further comprises a position acquisition device that acquires a position of the vehicle, and, in accordance with the position of the vehicle acquired by the position acquisition device, the control device sets the first transmitter power output of the first electromagnetic wave to be transmitted from the communication section with the first cyclic period.

Some users may basically place the mobile device within the first transmission area after getting off the vehicle. Namely, when such a user parks the vehicle near its (her or his) house, the user may place the mobile device within the first transmission area. When the user parks the vehicle on a parking place other than near its house, on the other hand, the user may keep the mobile device with it without continuing to place the mobile device within the first transmission area. For example, when the user parks the vehicle on a large-size parking place of a supermarket or the like, the user may sometimes want the vehicle doors to be unlocked in response to the user merely getting into a large first transmission area. Thus, it is preferable that the first transmission area be set in accordance with a place where the user parks the vehicle. Namely, in this case, the smart entry system according to the sixth aspect can use a current position of the vehicle so that the first transmission area is set in accordance with the current position.

In the seventh aspect, there is provided a smart entry system that detects whether or not a mobile device is present within a first transmission area set outside of a vehicle, which comprises: a communication section that transmits, with a first cyclic period, a first electromagnetic wave, generating the first transmission area, to outside of the vehicle and receives from the mobile device a response to the first electromagnetic wave; a control device that determines, based on presence/absence of the response from the mobile device, whether the mobile device is present within the first transmission area; and a position acquisition device that acquires a position of the vehicle. In accordance with the position of the vehicle acquired by the position acquisition device, the control device sets first transmitter power output of the first electromagnetic wave to be transmitted from the communication section with the first cyclic period.

Some users may basically place the mobile device within the first transmission area after parking the vehicle near the users' house and getting off the vehicle. Namely, the mobile device may continue to stay within the first transmission area. When such a user parks the vehicle on a large-size parking place of a supermarket or the like, the user may sometimes want the vehicle doors to be unlocked in response to the user merely getting into a large first transmission area. Thus, it is preferable that the first transmission area be set in accordance with a place where the user parks the vehicle. In this case, the smart entry system according to the seventh aspect can use a current position of the vehicle so that the first transmission area is set in accordance with the current position. In addition, if the first transmission area is set small, for example, it is more likely that there will be no response from the mobile device placed near the vehicle.

In eighth aspect depending on the seventh aspect, the smart entry system further comprises a notification section that provides a user with notification information corresponding to the first transmitter power output. According to the eighth aspect, the notification section can provide the user with notification information corresponding to the first transmitter power output, i.e. can inform the user of the first transmission area having been set in accordance with a position of the vehicle. Therefore, the user can readily recognize how far away from the vehicle the mobile device should be located.

It should be appreciated that the present invention is not limited to the described exemplary aspects and various modifications of the aspects are possible without departing from the basic principles.

BRIEF DESCRIPTION OF THE DRAWINGS

Certain preferred embodiments will hereinafter be described in detail, by way of examples only, with reference to the accompanying drawings, in which.

DETAILED DESCRIPTION OF THE INVENTION

Figure 1:
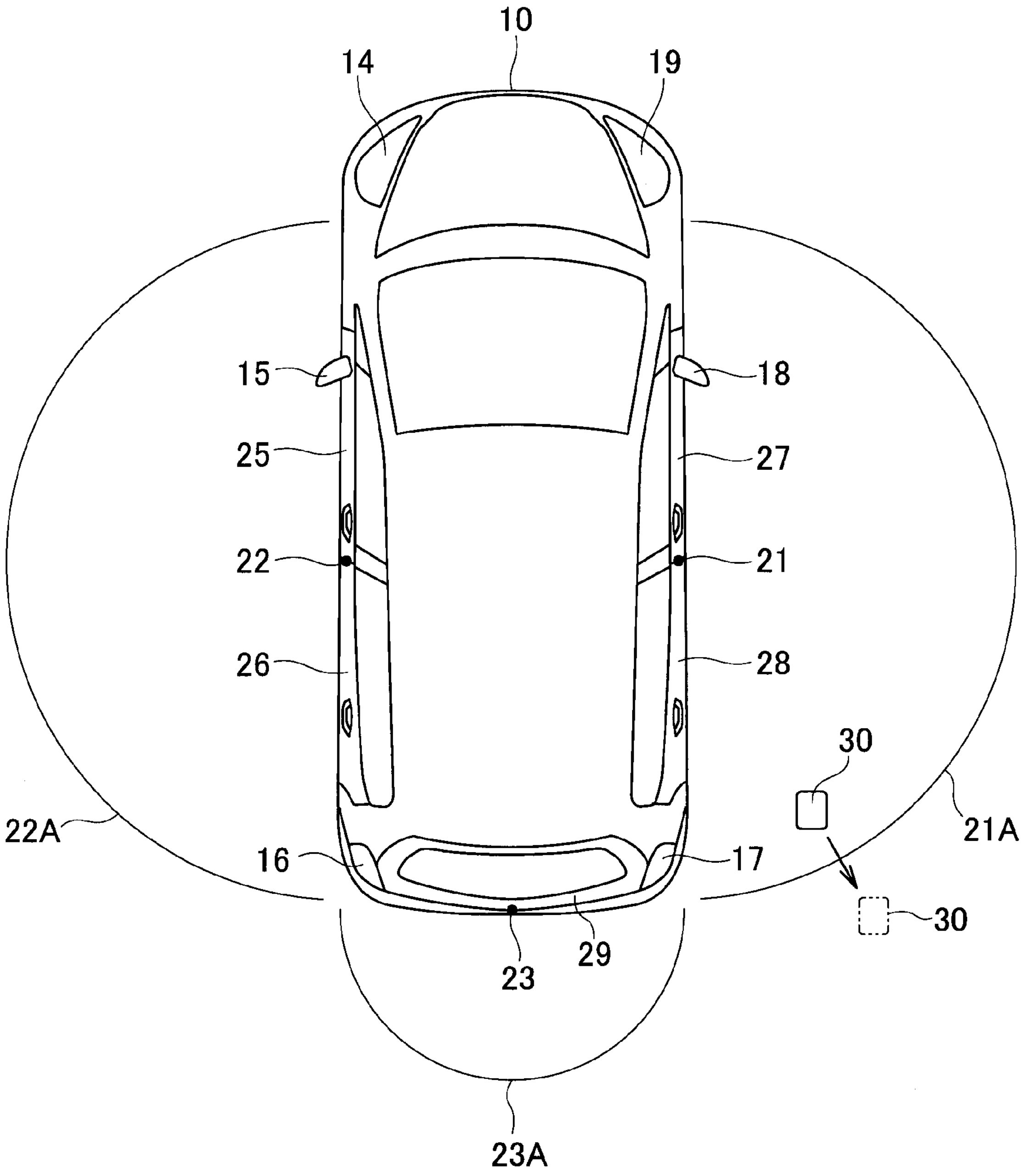
FIG. 1 is a view explanatory of an exemplary transmission area of a smart entry system according to the present invention.

The following will describe the preferred embodiments, but it should be appreciated that the present invention is not limited to the described embodiments and various modifications of the embodiments are possible without departing from the basic principles. The scope of the present invention is therefore to be determined solely by the appended claims. FIG. 1 is a view explanatory of an exemplary transmission area of a smart entry system according to the present invention. As shown in FIG. 1, such a transmission area is set outside of a vehicle 10 that is, for example, a motor vehicle. The transmission area shown in FIG. 1 is a first transmission area (hereinafter sometimes referred to as "first overall transmission area") that is set first as a user or passenger gets off the vehicle 10. The first transmission area (first overall transmission area) comprises, for example, three first transmission area portions or sub-areas 21A, 22A and 23A. In FIG. 1, a mobile device 30 depicted in solid line is shown as being present within the first transmission area (first overall transmission area) 21A, 22A, 23A. The mobile device 30 may get out of the first transmission areas 21A, 22A, 23A as depicted in two-dot chain line as the user keeping or having the mobile device 30 with it (her or him) gets away from the vehicle 10. By the user getting out of the first overall transmission area 21A, 22A, 23A like this, all of a plurality of doors (in the illustrated example of FIG. 1, five doors 25 to 29) of the vehicle 10 are locked substantially simultaneously, for example. Further, as the mobile device 30 depicted in two-dot chain line enters the first transmission area 21A, 22A, 23A next time, all the doors 25 to 29 are unlocked substantially simultaneously, for example.

Figure 2:
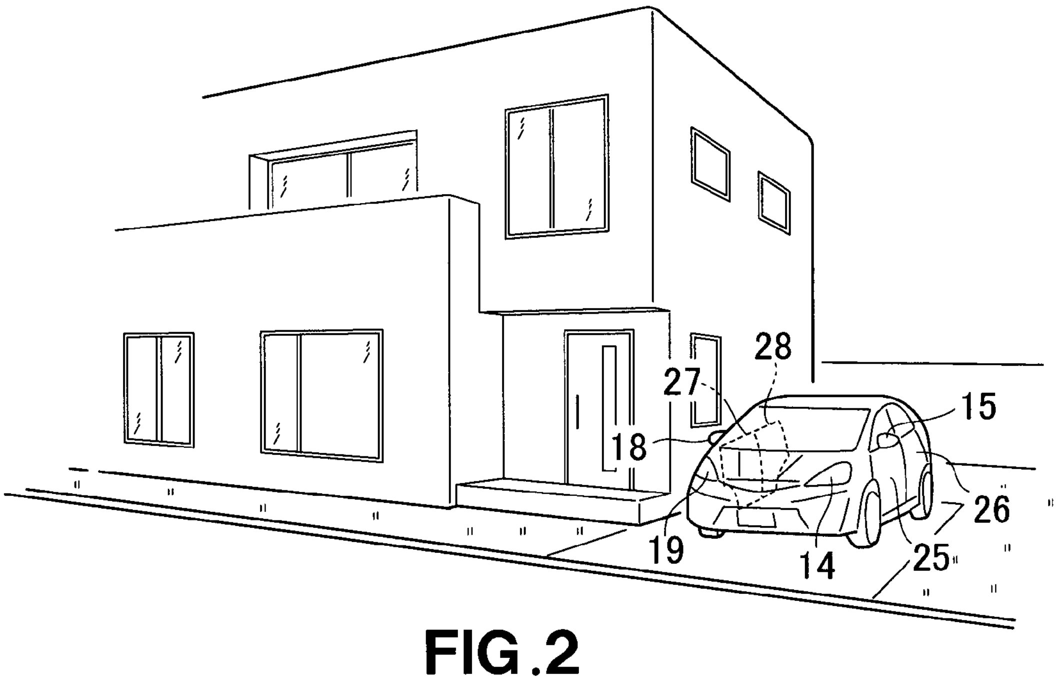
FIG. 2 is an outer appearance view of a vehicle when a user of the smart entry system of FIG. 1 parks the vehicle near the house of the user.

FIG. 2 is an outer appearance view of the vehicle 10 when the user of the smart entry system of FIG. 1 parks the vehicle 10 near the house of the user. The user may usually or sometimes put or place the mobile device 30 within the first transmission areas 21A, 22A, 23A after getting off the vehicle 10. Namely, for example, if there is only a small distance between the user's house and the vehicle 10 and the user places the mobile device 30 near the porch of the house, the mobile device 30 will stay for a predetermined time or over, for example, within the first transmission area 21A set outside the right doors 27 and 28 of the vehicle 10. Alternatively, if the user places the mobile device 30 within a garage (not shown in FIG. 2), the mobile device 30 may stay for a predetermined time or over within the first overall transmission area 21A, 22A, 23A.

In such a situation, the mobile device 30 keeps responding to any of electromagnetic waves generating or setting the first transmission areas 21A, 22A, 23A and hence continues wastefully consuming electric power for responding to the electromagnetic wave(s). Therefore, if the mobile device 30 stays within the first transmission areas 21A, 22A, 23A for the predetermined time or over, it is preferable that the first transmission area(s) 21A, 22A, 23A will be reduced in size or narrowed.

However, because the first transmission area(s) 21A, 22A, 23A is (are) reduced in size or narrowed like this, none of the doors 25 to 29 are unlocked unless the user keeping or having the mobile device 30 with it (her or him) approaches the vehicle 1 to get deep into the first (i.e., unnarrowed) transmission area 21A, 22A, 23A of FIG. 1. In addition or alternatively, the user having the mobile device 30 with it (her or him) is not welcomed, for example, by illumination of a direction indicator unless the user approaches the vehicle 1 to get deep into the first (i.e., unnarrowed) transmission area 21A, 22A, 23A of FIG. 1. It might be likely that some users do not prefer narrowing of the first transmission area(s) 21A, 22A, 23A. Note that blinking mechanisms, such as direction indicators, can be provided, for example, on headlight sections 14 and 19, door mirror sections 15 and 18 and taillight sections 16 and 17.

Thus, when, after the narrowing of the first transmission area(s) 21A, 22A, 23A, the mobile device 30 gets away from the vehicle 10 out of the first transmission areas 21A, 22A, 23A, the first transmission area(s) 21A, 22A, 23A need not be narrowed any longer. Namely, it is preferable that, after the narrowing of the first transmission area(s) 21A, 22A, 23A, a determination be made periodically as to whether the mobile device 30 is present within the first transmission areas 21A, 22A, 23A, and that the first transmission areas 21A, 22A, 23A be settable again. Such arrangements can enhance user convenience.

Figure 3:
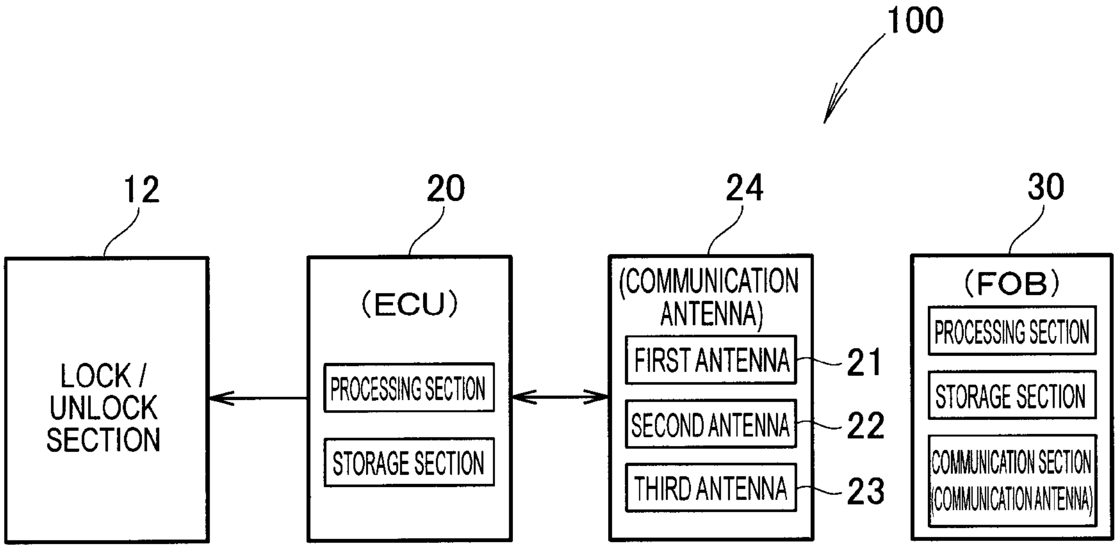
FIG. 3 is an exemplary block diagram depicting the smart entry system of FIG. 1.

FIG. 3 is an exemplary block diagram depicting the smart entry system 100 of FIG. 1. As shown FIG. 3, the smart entry system 100 comprises, for example, a communication section 24 and a control device 20. The communication section 24 shown in FIG. 3 transmits, with a first cyclic period, the first electromagnetic waves generating the first transmission areas 21A, 22A, 23A to outside of the vehicle 10 and is capable to receiving from the mobile device 30 a response to the first electromagnetic wave(s). Further, the control device 20 of FIG. 3 determines, on the basis of presence/absence of a response from the mobile device 30, whether the mobile device 30 is present within the first transmission area(s) 21A, 22A, 23A. Thus, the smart entry system 100 can detect whether or not the mobile device 30 is present within the first transmission areas 21A, 22A, 23A set outside of the vehicle 10.

The smart entry system 100 can further comprise the mobile device 30 and/or a lock/unlock section 12, for example. The mobile device 30 of FIG. 3 is capable of receiving the first electromagnetic wave(s) transmitted from the communication section 24 with the first cyclic period and transmitting a response in response to receipt of the first electromagnetic wave(s) from the communication section 24. When the mobile device 30 gets out of the first transmission areas 21A, 22A, 23A, namely, when the status of the response from the mobile device 30 changes from "present" to "absent", the lock/unlock section 12 can lock at least one, preferably all of, the five doors 25, 26, 27, 28 and 29 of the vehicle 10.

Then, when the mobile device 30 gets into the first transmission areas 21A, 22A, 23A, namely, when the status of the response from the mobile device 30 changes from "absent" to "present", the lock/unlock section 12 can unlock all of the locked doors 25 to 29, for example.

Note that the response from the mobile device 30 may have intensity of the first electromagnetic wave received by the mobile device 30. As the first electromagnetic wave received by the mobile device 30 is of a predetermined intensity or more, i.e. as the user having the mobile device 30 with it further approaches the vehicle 10 after the mobile device 30 has got into the first transmission area(s) 21A, 22A, 23A, the lock/unlock section 12 may unlock all of the locked doors 25 to 29, for example.

Moreover, the smart entry system 100 of FIG. 3 may comprise operation sections (not shown) provided, for example, on or in knobs of the doors 25 to 29. The lock/unlock section 12 may unlock all of the locked doors 25 to 26 in response to the mobile device 30 entering the first transmission area(s) 21A, 22A, 23A and then the user touching at least one of the knobs of the locked doors 25 to 29. Similarly, the lock/unlock section 12 may unlock all of the locked doors 25 to 29 in response to the user having the mobile device 30 with it getting off the vehicle 10 and then touching at least one of the knobs of the locked doors 25 to 29.

The control device 20 of FIG. 3 is an electronic control unit (ECU) implemented, for example, by a microcomputer, and the control device 20 has a processing section that determines, on the basis of presence/absence of a response from the mobile device 30, whether or not the mobile device 30 is present within the first transmission area. The control device 20 also has a storage section prestoring therein, as an initial or default value, of transmitter power output of the first electromagnetic wave generating the first transmission area. The control device 20 can control the communication section 24 so that the first electromagnetic waves are transmitted from the communication section 24 with the prestored first transmitter power output and with the first cyclic period. The storage section of the control device 20 can also store therein unique ID information of the smart entry system 100 or vehicle 10, and the control device 20 can include the unique ID information in the first electromagnetic waves (request signal).

The storage section of the control device 20 may further store therein, for example, three antenna ID information identifying first, second and third antennas (transmission antennas) 21, 22 and 23 of the communication section 24. The control device 20 can include, in each of the first electromagnetic waves (request signal) transmitted from the first and second and third antennas 21, 22 and 23, both the unique ID information and the above-mentioned antenna ID information corresponding to one of first, second and third the antennas.

The communication section 24 of FIG. 3 may have a communication antenna, and the communication antenna includes, for example, the first to third antennas 21 to 23 as well as a not-shown reception antenna. Moreover, the communication section 24 may further include a not-shown transmission device comprising, for example, an oscillator, a modulator and an amplifier. Note, however, at least one of the oscillator, modulator and amplifier (i.e., a part or whole of the transmission device) may be provided in the control device 20.

The oscillator of the communication section 24 generates a signal that serves as a source of the frequency (transmission frequency) of each of the first electromagnetic waves transmitted from the first, second and third antennas (transmission antennas) 21, 22 and 23. The "transmission frequency" is, for example, a low frequency. Further, the modulator of the communication section 24 modulates the signal from the oscillator with the request signal from the control device 20 so that the request signal can be included in the first electromagnetic waves. The amplifier of the communication section 24 amplifies the signal from the modulator up to necessary electric power and then outputs the thus-amplified signal to the first, second and third antennas (transmission antennas) 21, 22 and 23. Note that the control device 20 can determine first transmitter power output of the first electromagnetic waves, for example, by controlling an amplification factor of the amplifier.

Figure 4C:
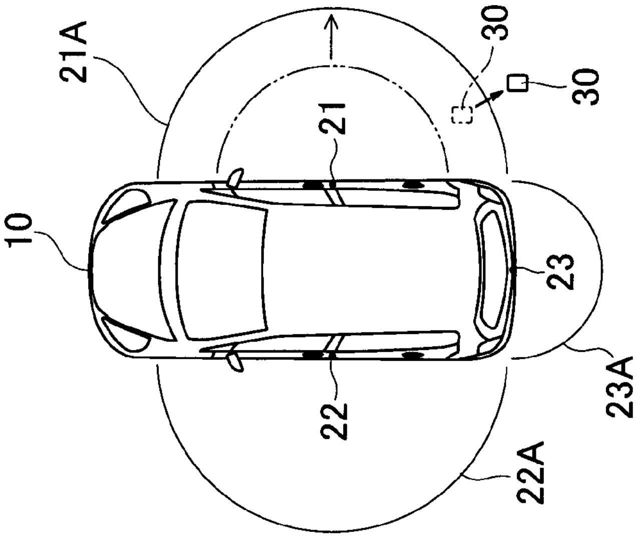
FIG. 4C is a view explanatory of an exemplary reset (set-again) first transmission area.
Figure 4B:
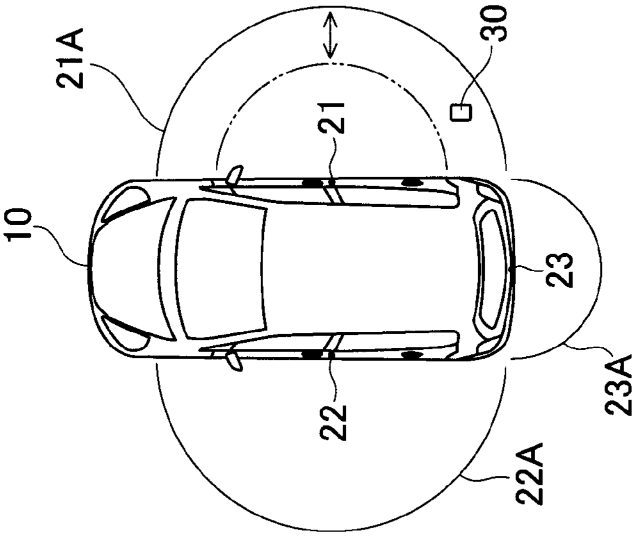
FIG. 4B is a view explanatory of an exemplary unnarrowed first transmission area that is set periodically.
Figure 4A:
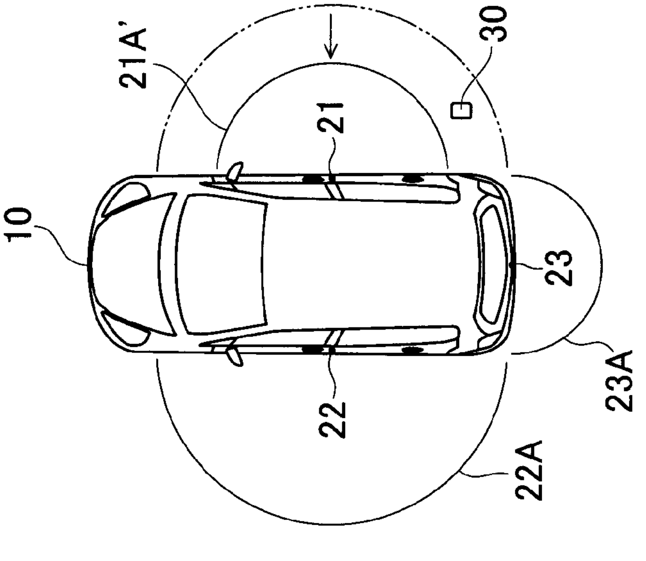
FIG. 4A is a view explanatory of an exemplary second transmission area narrowed from an exemplary first transmission area.

FIG. 4A is a view explanatory of an exemplary second transmission area 21A' narrowed from the first transmission area 21A, FIG. 4B is a view explanatory of an exemplary unnarrowed first transmission area 21A that is set periodically, and FIG. 4C is a view explanatory of an exemplary reset (set-again) first transmission area 21A. FIG. 1 shows the first transmission areas 21A, 22A, 23A which are set first as the user gets off the vehicle 10, and the mobile device 30 (depicted in solid line) continues to be present within the first transmission area 21A (reachable area) of the first electromagnetic waves transmitted from the first antenna 21 provided, for example, on a right side portion of the vehicle 1. Then, the first transmission area 21A is narrowed to the second transmission area 21A' (FIG. 4A). Because the mobile device 30 is present outside the narrowed or second transmission area 21A', the mobile device 30 does not respond to the first electromagnetic waves (request signal) and thus can avoid wastefully consuming electric power for responding to the first electromagnetic wave(s).

In FIG. 4A, only the first transmission area 21A (depicted in two-dot chain line) in which the mobile device 30 had been present is narrowed to the second transmission area 21A'. More specifically, the other first transmission areas 22A and 23A in which the mobile device 30 has not been present are maintained in size or left unnarrowed, and thus, the user having the mobile device 30 with it (her or him) can unlock the doors 25 to 29 of the vehicle 10 by merely entering the other first transmission areas 22A and 23A. Of course, the other first transmission areas 22A and 23A may also be narrowed as the first transmission area 21A is narrowed as above.

As shown in FIG. 4B, the second (or narrowed) transmission area 21A' (depicted in two-dot chain line) is enlarged or increased in size back to the first transmission area 21A (depicted in solid line) periodically. Because the mobile device 30 is present within the periodically-set first transmission area 21A, the first transmission area 21A (solid line) is narrowed again to the second transmission area 21A' (as depicted in two-dot chain line in (B) of FIG. 4). Namely, in the instant embodiment, it is determined that the control device 20 determines whether the mobile device 30 continues to be present within the periodically-set first transmission area 21A.

Further, as shown in FIG. 4C, the first transmission area 21A (solid line) is set again after the mobile device 30 (solid line) got away from the vehicle 10 out of the unnarrowed first transmission area 21A. Namely, when the mobile device 30 gets away from the vehicle 10 out of the unnarrowed first transmission area 21A, the first transmission sub-area 21A (solid line) is not narrowed, and the first electromagnetic wave generating the first transmission area 21A (solid line) retains again the first transmitter power output. In this way, the instant embodiment can achieve enhanced user convenience.

The mobile device 30 of FIG. 3 is, for example, in the form of a key fob comprising an FPGA and a communication device, and the mobile device 30 has a processing section that generates a response to the first electromagnetic wave(s) sent from the control device 20 or the communication section 24. The mobile device 30 can have a storage section capable of storing therein the unique ID information of the smart entry system 100 or the vehicle 10, and the mobile device 30 can include such unique ID information in a response (acknowledge signal) to be returned in response to the first electromagnetic wave(s) or the request signal.

When unique ID information is included in the request signal, the processing section of the mobile device 30 determines whether the unique ID information included in the request signal matches the unique ID information stored in the storage section of the mobile device 30. If the unique ID information included in the request signal matches the unique ID information stored in the storage section of the mobile device 30, the mobile device 30 can transmit a response (acknowledge signal).

Further, the mobile device 30 can have a communication section having, for example, a communication antenna, and the communication antenna may include a reception antenna and a transmission antenna (not shown). The communication section of the mobile device 30 may further include, for example, a receiver that comprises a tuner, an amplifier and a demodulator (not shown), and a transmitter comprising an oscillator, a modulator and an amplifier (not shown). Note however, at least one of the not-shown tuner, amplifier and demodulator of the receiver (i.e., a part or whole of the receiver) and/or at least one of the not-shown oscillator, modulator and amplifier of the transmitter (i.e., a part or whole of the transmitter) may be provided in the mobile device 30.

The tuner of the receiver of the mobile device 30 is connected to the reception antenna, and the tuner can extract a transmission frequency component of the first electromagnetic wave(s) received via the reception antenna, and reduce or remove noise included in the first electromagnetic wave(s). The amplifier of the receiver of the mobile device 30 amplifies the signal received from the tuner, and the demodulator of the receiver of the mobile device 30 demodulates the amplified signal. Thus, the processing section of the mobile device 30 can recognize the request signal included in the first electromagnetic wave(s). Then, the processing section of the mobile device 30 authenticates the unique ID information and generates an acknowledge signal (response), after which the processing section can transmit the acknowledge signal (response) via the transmitter and the transmission antenna of the mobile device 30.

The oscillator of the transmitter of the mobile device 30 generates a signal that serves as a source of a frequency (transmission frequency) of electromagnetic wave (acknowledge signal) forming a response to be returned via the transmission antenna of the transmitter of the mobile device 30. Here, the transmission frequency of the oscillator of the transmitter of the mobile device 30 is, for example, an RF frequency (Radio Frequency) or UHF frequency (Ultra High Frequency).

The processing section of the mobile device 30 can include, in the electromagnetic wave (acknowledge signal) to be transmitted via the transmission antenna of the transmitter of the mobile device 30, not only the unique ID information but also at least one of the three antennal ID information and reception intensity information indicative of reception intensity, in the mobile device 30, corresponding to the at least one of the three antennal information.

The communication section 24 of FIG. 3 may further include the receiver that comprises the tuner, amplifier and demodulator as noted above. Note, however, at least one of the tuner, amplifier and demodulator (i.e., a part or whole of the receiver) may be provided in the control device 20.

When the control device 20 has received the response (acknowledge signal) from the mobile device 30, it determines that the mobile device 30 is present within the first overall transmission area 21A, 22A, 23A. If the acknowledge signal includes the unique ID information, the processing section of the control device 20 can determine whether the mobile device 30 is present within the first overall transmission area 21A, 22A, 23A, after authenticating the unique ID information included in the acknowledge signal. Further, if the acknowledge signal includes at least one of the three antenna information, then the processing section of the control device 20 can identify a particular sub-area(s) of the first overall transmission area 21A, 22A, 23A, such as the first transmission sub-area 21A set to the right of the vehicle 10. Note, when the at least piece of the three antenna information is a plurality of antenna information, then a position of the mobile device 30 may be identified or estimated taking into account a plurality of reception intensity information of the plurality of antenna information.

When the response (acknowledge signal) from the mobile device 30 includes at least one of the three antenna information, the control device 20 of FIG. 3 can determine whether the mobile device 30 has continued to be present within a particular sub-area (e.g., the first transmission area 21A) of the first overall transmission area 21A, 22A, 23A for a predetermined time or over. This is because the control device 20 can narrow only the particular sub-area (such as the first transmission area 21A), for example, to the second transmission sub-area 21A' (see FIG. 4A).

In other words, the first overall transmission area 21A, 22A, 23A is set first as the user gets off the vehicle 10, and then, when the mobile device 30 has continued to be present within a particular sub-area (e.g., the first transmission area 21A) of the first overall transmission area 21A, 22A and 23A, the first-set first overall transmission area 21A, 22A, 23A is narrowed to a second transmission area (hereinafter sometimes referred to as "second overall transmission area") 21A', 22A, 23A comprising the second (or narrowed) transmission area 21A' and the unnarrowed first transmission areas 22A and 23A (see FIG. 4A).

The control device 20 of FIG. 3 can reduce or lower first transmitter power output of the first electromagnetic wave to be transmitted, for example, from the first antenna 21, disposed on the right side portion of the vehicle 10, in such a manner that only a particular transmission area (e.g., first transmission area 21A) of the first overall transmission area 21A, 22A, 23A is narrowed. For example, the first electromagnetic waves setting the first overall transmission area 21A, 22A, 23A including the first transmission sub-sub-area 21A are transmitted to outside of the vehicle 10 (i.e., to the mobile device 30) with the first cyclic period or intermittently. However, while the first transmitter power output of the first electromagnetic wave setting only the particular transmission area (e.g., first transmission area 21A) is being lowered, the control device 20 of FIG. 3 can transmit the first electromagnetic wave setting only the particular area (e.g., first transmission area 21A) to outside of the vehicle 10 (i.e., to the mobile device 30) continuously or with a cyclic period shorter than the above-mentioned first cyclic period.

More specifically, the processing section of the control device 20 of FIG. 3 gradually reduces the amplification factor of the amplifier of the transmitter of the communication section 24 to thereby change the transmitter power output of the first electromagnetic waves setting only the particular area (e.g., first transmission area 21A) to second transmitter power output, until no more response (acknowledge signal) is received from the mobile device 30. At that time, the processing section of the control device 20 of FIG. 3 can control the lock/unlock section 12, for example, to lock all of the doors 25 to 29. For example, after the first-set first overall transmission area 21A, 22A, 23A is narrowed to the second overall transmission area 21A', 22A, 23A and then all of the doors 25 to 29 are locked, the transmitter of the communication section 24 can transmit the first electromagnetic waves setting the second overall transmission area 21A', 22A, 23A, for example, with the first cyclic period.

After the second overall transmission area 21A', 22A, 23A is set outside of the vehicle 10, the processing section of the control device 20 of FIG. 3 can control the lock/unlock section 12, for example, to unlock all of the doors 25 to 29 as the mobile device 30 enters the second overall transmission area 21A', 22A, 23A. Note, however, that the mobile device 30 might sometimes get away from the vehicle 10 out of the unnarrowed first overall transmission area 21A, 22A, 23A.

Thus, as the mobile device 30 enters the second overall transmission area 21A', 22A, 23A the control device 20 can, for example, unlock all of the doors 25 to 29. Also, the processing section of the control device 20 controls the transmitter of the communication section 24 in such a manner that the unnarrowed first overall transmission area 21A, 22A, 23A can be set again as the mobile device 30 gets away from the vehicle 10 out of the first overall transmission area 21A, 22A, 23A.

More specifically, the transmitter of the communication section 24 can not only transmit, with the first cyclic period, the first electromagnetic waves setting the second overall transmission area 21A', 22A, 23A (only the narrowed transmission sub-area 21A' depicted in two-dot chain line in FIG. 4B), but also transmit, periodically or with the second cyclic period longer than the first cyclic period, the second electromagnetic wave setting the unnarrowed first transmission sub-area 21A (depicted in solid line in FIG. 4B). Further, when no response to the second electromagnetic wave transmitted with the second cyclic period and setting the unnarrowed first transmission sub-area 21A is received from the mobile device 30, the transmitter of the communication section 24 can transmit again the first electromagnetic waves setting the first overall transmission area 21A, 22A, 23A, which includes the unnarrowed first transmission sub-area 21A, with the first cyclic period.

Note that, whereas the first electromagnetic wave setting only the narrowed or second transmission area 21A' (sub-area) has the second transmitter power output lowered from the first transmitter power output, the first electromagnetic wave setting only the first (unnarrowed) transmission area 21A (sub-area) has the first or unpowered transmitter power output.

Figure 5:
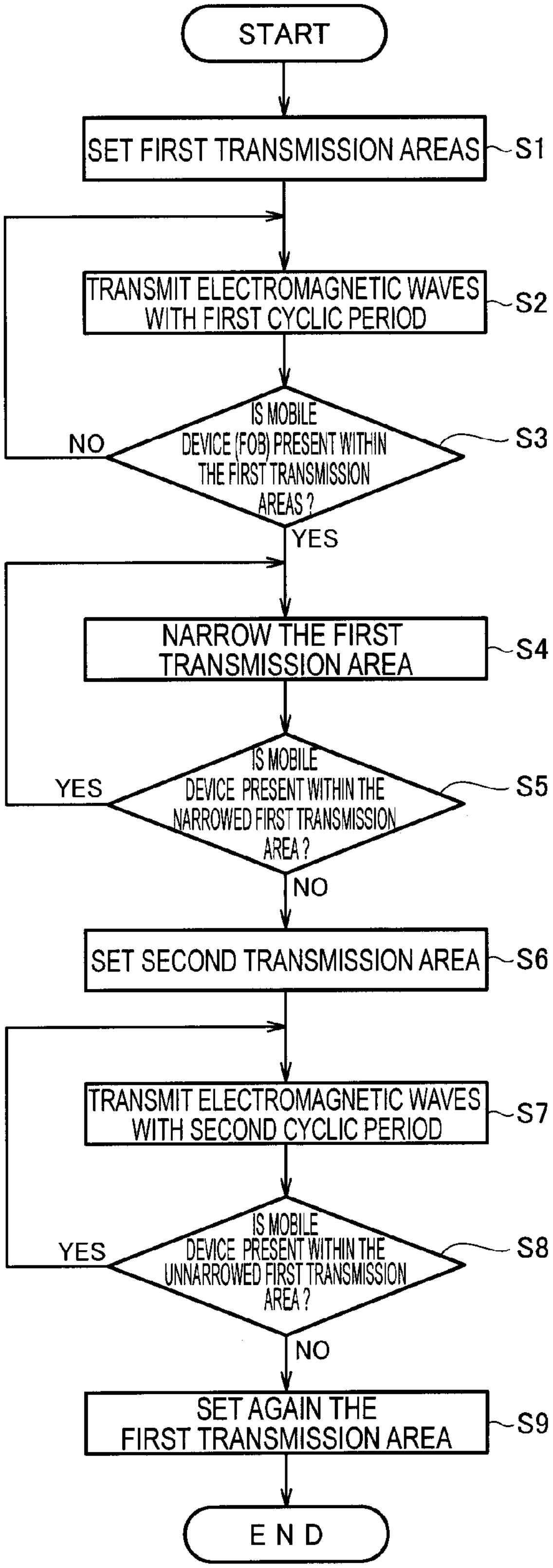
FIG. 5 is a flow chart showing example behavior of the smart entry system of FIG. 3.

FIG. 5 is a flow chart showing example behavior of the smart entry system 100, including, in particular, the exemplary changes between the first transmission areas 21A and 21A' (sub-areas) shown in FIGS. 4A, 4B and 4C. In FIG. 5, "START" indicates a time point when a drive section (not shown), such as an engine, of the vehicle 10 has been turned off, that is, in this case, the flow of FIG. 5 starts when the drive section of the vehicle 10 has been turned off. The processing section of the control device 20 of FIG. 3, for example, reads out the first transmitter power output stored as an initial or default value in the storage section of the control device 20, and then, the processing section of the control device 20 sets the amplifier factor of the amplifier of the transmitter of the communication section 24 so that each of the first electromagnetic waves transmitted from the first, second and third antennas (transmission antennas) 21, 22 and 23 has the first transmitter power output (step S1 of FIG. 5).

In FIGS. 1 and 4A to 4C, the first transmission sub-area 21A set by the first electromagnetic wave transmitted from the first antenna 21 provided on the right side portion of the vehicle 10 has an extent substantially identical to that of the first transmission sub-area 22A set by the first electromagnetic wave transmitted from the second antenna 22 provided on a left side portion of the vehicle 10. Further, the first transmission sub-area 23A set by the first electromagnetic wave transmitted from the third antenna 23 provided on a rear end portion of the vehicle 10 has an extent smaller than that of the first transmission sub-area 21A set by the first electromagnetic wave transmitted from the first antenna 22 provided on the right side portion of the vehicle 10.

Thus, the first transmitter power output of the first electromagnetic waves setting a transmission sub-area is set for each of the transmission antennas 21 to 23. In other words, in the case where the communication section 24 of FIG. 3 includes three antennas 21, 22 and 23, the first electromagnetic waves comprise three electromagnetic waves, and the first transmitter power output comprises three first transmitter power output. Further, in the illustrated example of FIG. 1 or 4, the first transmitter power output of the first electromagnetic wave transmitted from the first antenna 21 is set substantially identical to the first transmitter power output of the first electromagnetic wave transmitted from the second antenna 22, and the first transmitter power output of the first electromagnetic wave transmitted from the third antenna 23 is set smaller than the above-mentioned first transmitter power output of the first electromagnetic wave transmitted from the first antenna 21.

At step S2 of FIG. 5, the first, second and third antennas (transmission antennas) 21, 22 and 23 of the communication section 24 simultaneously transmit the three first electromagnetic waves, setting the first transmission areas 21A, 22A, 23A (overall area), to outside of the vehicle 10 with the first cyclic period, for example. Before or when step S2 of FIG. 5 is executed, the control device 20 of FIG. 3 may set a not-shown inner transmission area inside the vehicle 10 via a not-shown in-vehicle transmission antenna provided in the communication section 24. Further, when the mobile device 30 is not present within the inner transmission area, the control device 20 may execute step S3 of FIG. 5.

At step S3 of FIG. 5, the processing section of the control device 20 determines, based on presence/absence of a response from the mobile device 30 to any one of the three first electromagnetic waves, whether or not the mobile device 30 is present within the first overall transmission area 21A, 22A, 23A.

For example, when the mobile device 30 is present within the first transmission sub-area 21A, the mobile device 30 can transmit a response (acknowledge signal) to the first electromagnetic wave (request signal) transmitted from the first antenna 21, and the reception antenna of the communication section 24 can receive this response (acknowledge signal) from the mobile device 30. When the reception antenna of the communication section 24 has received the response (acknowledge signal) from the mobile device 30, the processing section of the control device 20 can determine that there has been a response from the mobile device 30, i.e. that the mobile device 30 is present at least within the first transmission sub-area 21A. When the mobile device 30 is not present within the first transmission sub-area 21A, on the other hand, the mobile device 30 cannot transmit the response to the first electromagnetic wave transmitted from the first antenna 21, and thus, the processing section of the control device 20 determines that there has been no response from the mobile device 30, i.e. that the mobile device 30 is not present within the first transmission sub-area 21A.

When the mobile device 30 has transmitted a response to at least one of the three first electromagnetic waves, the processing section of the control device 20 determines at step S3 that the mobile device 30 is present within the first overall transmission area 21A, 22A, 23A. When the mobile device 30 has not transmitted a response to any one of the three first electromagnetic waves, on the other hand, the processing section of the control device 20 determines at step S3 that the mobile device 30 is not present within the first overall transmission area 21A, 22A, 23A.

More specifically, at step S3 of FIG. 5, the control device 20 determines whether the mobile device 30 has continued to be present within the first overall transmission area 21A, 22A, 23A for the predetermined time or over. Because each of the three first electromagnetic waves is transmitted to outside of the vehicle 10 with the first cyclic period, the predetermined time is set longer than the first cyclic period. Also, the control device 20 may determine whether or not the response from the mobile device 30 has continued to be received by the communication section 24 with the first cyclic period or continuously.

If the response from the mobile device 30 includes reception intensity information indicative of reception intensity in the mobile device 30 and if a reception intensity variation rate with respect to at least one of the three first electromagnetic waves is of a predetermined value or below, the control device 20 may determine at step S3 whether the mobile device 30 is currently at a stop within the first overall transmission area 21A, 22A, 23A.

If it is determined at step S3 that the mobile device 30 has continued to be present within the first overall transmission area 21A, 22A, 23A for the predetermined time or over, preferably, if the mobile device 30 has continued to be at a stop within the first overall transmission area 21A, 22A, 23A, the processing section of the control device 20 of FIG. 3 slightly reduces or lowers the first transmitter power output of the first electromagnetic wave to be transmitted from the first antenna 21 in such a manner that, of the first overall transmission area 21A, 22A, 23A, only the first transmission sub-area 21A where the mobile device 30 is present is slightly narrowed, at step S4 of FIG. 5.

Then, at step S5 of FIG. 5, the control device 20 determines whether the mobile device 30 is present within the slightly-narrowed first transmission sub-area 21A, for example. The operations of steps S3 and S4 are repeated until no more response is received from the mobile device 30. Thus, the first transmitter power output (initial or default value) of the first electromagnetic power transmitted from the first antenna is lowered to the second transmitter power output.

At next step S6 of FIG. 5, the control device 20 sets an amplification factor of the amplifier of the transmitter of the communication section 24 which corresponds to the second transmitter power output of the first electromagnetic wave transmitted from the first antenna 21. At that time, the processing section of the control device 20 may store a setting of the second transmitter power output in the storage section of the control device 20, for example.

By the execution of such step S6, the first-set first overall transmission area 21A, 22A, 23A is narrowed to the second overall transmission area 21A', 22A, 23A comprising the narrowed transmission sub-area 21A' and the unnarrowed transmission sub-areas 22A and 23A (FIG. 4A), for example. Then, the communication section 24 transmits, with the first cyclic period, the first electromagnetic waves setting the second overall transmission area 21A', 22A, 23A.

The second overall transmission area 21A', 22A, 23A is set with the first cyclic period, but it is likely that the mobile device 30 gets away (is moved away) from the vehicle 10 out of the unnarrowed or first overall transmission area 21A, 22A, 23A. Thus, the communication section 24 can not only transmit, with the first cyclic period, the first electromagnetic waves setting the second overall transmission area 21A', 22A, 23A, but also transmit, periodically or with the second cyclic period longer than the first cyclic period, the second electromagnetic wave setting the unnarrowed first transmission sub-area 21A (step S7 of FIG. 5).

At step S8 of FIG. 5, the control device 20 determines whether or not the mobile device 30 is present within the unnarrowed first transmission sub-area 21A. If the mobile device 30 is present within the unnarrowed first transmission sub-area 21A as determined at step S8, the communication section 24 continues to transmit the first electromagnetic waves setting the second transmission overall area 21A', 22A, 23A with the first cyclic period. Then, the communication 24 continues to transmit, periodically or with the second cyclic period longer than the first cyclic period, the second electromagnetic wave setting the unnarrowed first transmission sub-area 21A.

If the mobile device 30 is not present within the unnarrowed first transmission sub-area 21A as determined at step S8, the flow goes to step S9 of FIG. 5, where the communication section 24 stops transmitting, with the second cyclic period, the second electromagnetic wave setting the unnarrowed first transmission sub-area 21A, but also the control device 20 returns the second transmitter power output (set value) of the first electromagnetic waveform transmitted from the first antenna 21 with the first cyclic period back to the first transmitter power output (initial or default value).

By the execution of such step S9, the second overall transmission area 21A', 22A, 23A, comprising the narrowed transmission sub-area 21A' and the unnarrowed transmission sub-areas 22A and 23A, is again set to or enlarged to the first (unnarrowed) overall transmission area 21A, 22A, 23A comprising the unnarrowed (enlarged) first transmission sub-area 21A and the unnarrowed first transmission sub-areas 22A and 23A (see FIG. 4C). Then, the communication section 24 continues to transmit, with the first cyclic period, the first electromagnetic waves setting again the first (unnarrowed) overall transmission area 21A, 22A, 23A.

Figure 6:
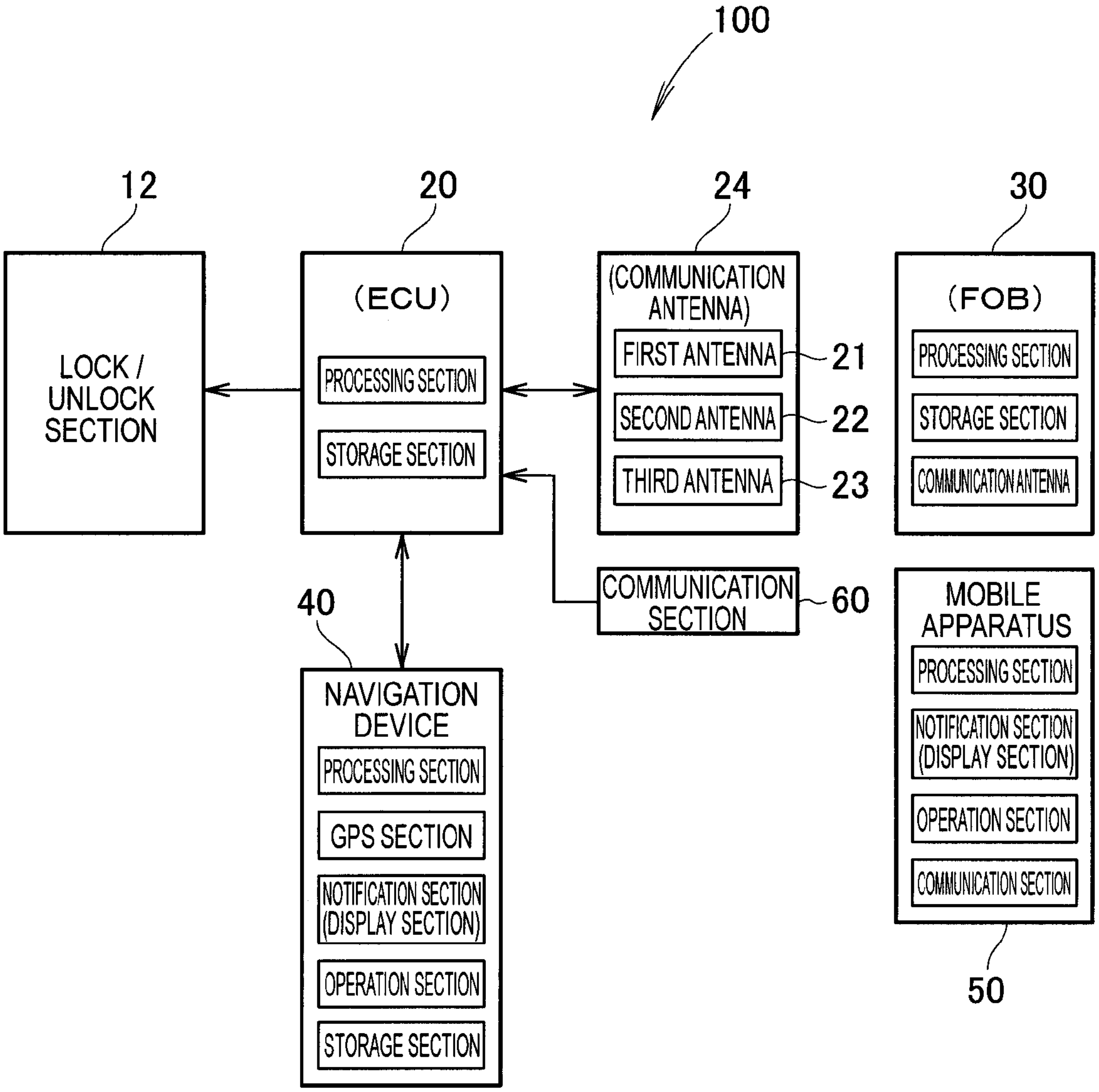
FIG. 6 is another block diagram depicting the smart entry system of FIG. 1.

FIG. 6 shows another block diagram of the smart entry system 100 of FIG. 1. The smart entry system 100 of FIG. 6 may further comprise a navigation device 40 that navigates a route to a desired destination, for example. Note that the navigation device 40 includes a GPS (Global Positioning System) section that acquires a current position of the vehicle 10. The smart entry system 100 of FIG. 6 may further comprise, in place of the navigation device 40, a device having a function corresponding to the GPS section of the navigation device 40, namely, a position acquisition device that acquires a current position of the vehicle 10.

The smart entry system 100 or the control device 20 of FIG. 6 can use the acquired current position of the vehicle 10 for the following purposes. More specifically, in accordance with the acquired current position of the vehicle 10, the control device 20 can set a value of the first transmitter power output of the first electromagnetic waves transmitted from the communication section 24 with the first cyclic period. At step S1 of FIG. 5, the processing section of the control device 20 of FIG. 6 reads out the value of the transmitter power output thus set in accordance with the current position of the vehicle 10, rather than the initial or default value stored in the storage section of the control device 20 and thereby sets an amplification factor of the amplifier of the transmitter of the communication section 24 such that the first electromagnetic waves transmitted from each of the first to third transmission antennas 21, 22 and 23 have the first transmitter power output.

When the user parks the vehicle 10 near its (her or his) house, the user may place the mobile device 30, for example, within the first transmission sub-area 21A. On the other hand, when the user parks the vehicle on a parking place other than near its house, the user may keep the mobile device 30 with it without continuing to place the mobile device 30 within the first overall transmission area 21A, 22A, 23A. Thus, it is preferable that the smart entry system 100 or the control device 20 of FIG. 6 sets or determines a size or stretch of the first transmission sub-area 21A or a size or stretch the first overall transmission area 21A, 22A, 23A in accordance with the place where the user parks the vehicle 10.

At step S6 of FIG. 5, the control device 20 sets an amplification factor of the amplifier of the transmitter of the communication section 24 which corresponds to the second transmitter power output of the first electromagnetic wave transmitted from the first antenna 21, as described above. At that time, the processing section of the control device 20 may store a set value of the second transmitter power output in the storage section of the control device 20. In addition, the control device 20 of FIG. 6 may further store a current position of the vehicle 10 as a first position when storing the set value of the second transmitter power output of the first electromagnetic wave that is transmitted from the communication section 24 and that sets the narrowed transmission sub-area 21A'.

In a case where a place near the user's house is prestored in advance as the above-mentioned first position, for example, in the storage section of the control device 20, and when the vehicle 10 is currently in the first position, the control device 20 of FIG. 6 can, for example at step S1 of FIG. 6, use the second transmitter power output (set value) previously recorded for the above-mentioned first position (e.g., near the user's house) in place of the first transmitter power output (initial or default value).

Thus, when the user has parked the vehicle 10 near its house and turned off the drive section, such as the engine, of the vehicle 10, the entry smart system 100 of the FIG. 6 can modify step S1 of FIG. 5 so as to first set the second overall transmission area 21A', 22*a*, 23A. Namely, because, in this case, the second overall transmission area 21A', 22*a*, 23A rather than the first overall transmission area 21A, 22*a*, 23A is set as the user gets off the vehicle 10, there is no need to narrow the first transmission sub-area 21A to the second transmission sub-area 21A'. Further, because the second overall transmission area 21A', 22*a*, 23A rather than the first overall transmission area 21A, 22*a*, 23A is set as the user gets off the vehicle 10, the mobile device 30 is not present within the transmission sub-area 21A, and thus, step S4 of FIG. 5 can be omitted, for example.

Further, when the user has parked the vehicle 10 in a parking space other than near its house, and turned off the drive section, such as the engine, of the vehicle 10, the entry smart system 100 of the FIG. 6 may execute step S1 of FIG. 1. Alternatively, when the user has parked the vehicle 10 in a parking space other than near its house, and turned off the drive section, such as the engine, of the vehicle 10, the entry smart system 100 of the FIG. 6 may use the first overall transmission area set in accordance with the current position of the vehicle 10, without executing steps S2 to S9 of FIG. 5.

When S2 to S9 of FIG. 5 are not executed as above, the entry smart system 100 of FIG. 6 can set the first overall transmission area in accordance with the current position of the vehicle 10. When the user parks the vehicle 10 on a large-size parking place of a supermarket or the like, the smart entry system 100 of FIG. 6 can increase or raise the first transmitter power output (initial or default value) of the first electromagnetic waves transmitted from the communication section 24 with the first cyclic period. In this way, the entry smart system 100 of FIG. 6 can unlock the doors 25 to 29 in response to the mobile device 30 only entering a large transmission area. Further, when the user parts the vehicle 10 near its house, the entry smart system 100 of FIG. 6 can lower the first transmitter power output (initial or default value) of the first electromagnetic waves transmitted from the communication section 24 with the first cyclic period. In this way, the first overall transmission area can be set in accordance with a place where the user parts the vehicle 10.

The navigation device 40 of FIG. 6 may include a processing section and a storage section, for example. The storage section of the navigation device 40 may store therein map information, so that the processing section of the navigation device 40 can register the user's house in the map information. The processing section of the navigation device 40 can determine whether the vehicle 10 is currently parked near the user's house, and it can output a result of the determination to the control device 20. Further, the map information may include parking place information, so that the processing section of the navigation device 40 can determine whether the vehicle 10 is currently parked on the parking place registered in the parking place information. Further, the storage section of the navigation device 40 may store therein relational expressions or a table indicative of relationship between the user's house, parking place, etc. and sizes of the first overall transmission area, so that, in accordance with the relational expressions or a table, the processing section of the control device 20 can adjust the first transmitter power output (initial or default value) of the first electromagnetic waves transmitted from the communication section with the first cyclic period.

Further, the storage section of the control device 20 may store therein relational expressions or a table indicative of relationship between positions of the vehicle 10 and sizes of the first overall transmission area, so that, in accordance with the relational expressions or a table, the processing section of the control device 20 can adjust the first transmitter power output (initial or default value) based on a current position of the vehicle 10 by merely inputting thereto the current position of the vehicle 10 from the navigation device 40 or the position acquisition device.

The navigation device 40 of FIG. 6 may include, for example, a notification section, such as a display section. For example, when step S6 of FIG. 5 has been executed but step S9 has not been executed, the notification section of the navigation device 40 of FIG. 6 can provide the user with notification information corresponding to the second transmitter power output lowered from the first transmitter power output. The notification section employed here is not necessarily limited to the notification section of the navigation device 40 and may be a notification section of an apparatus that is a mobile apparatus 50, a not-shown meter apparatus, etc. For example, the notification information corresponding to the second transmitter power output can inform the user that the first overall transmission area (alternatively, the first transmission sub-area) where the mobile device 30 has continued to be present for the predetermined time or over was placed to the second overall transmission area (alternatively, the second transmission sub-area). Particularly, following the determination that the mobile device 30 enters the second or narrowed transmission area (i.e., narrowed transmission sub-area, or overall transmission area including the narrowed transmission sub-area), the notification section of the navigation device 40 may provide the user with the notification information corresponding to the second transmitter power output. In other words, because the notification information is provided to the user next time the user gets in the vehicle 10, the user can recognize more reliably that the first overall transmission area has been narrowed to the second overall transmission area.

The display section of the navigation device 40 can display a message in letters like "Communication area of the smart entry system has been narrowed.". Of course, the notification section of the navigation device 40 may be in the form of a speaker section that outputs a voice message like "communication area of the smart entry system has been narrowed" in addition to or in place of the message in letters. Thus, the user having recognized the narrowed or second transmission area can place the mobile device 30 in a living room or the like of the house remote from the vehicle 10 instead of placing the mobile device 30 in a porch or the like of the house near the vehicle 10.

The smart entry system 100 of FIG. 6 may include, for example, a communication section 60 and the mobile apparatus 50. The communication section 60 includes, for example, a WiFi communication module, a 3G communication module, an LTE communication module, or the like. A communication section of the mobile apparatus 50 includes, for example, a WiFi communication module, a 3G communication module, an LTE communication module, or the like. The mobile apparatus 50 may be in the form of a smartphone or a mobile phone connectable to a not-shown mobile phone network, such as the 3G or LTE network, or a tablet-type personal computer. The mobile apparatus 50 can receive, from the communication section 60, notification information corresponding to the second transmitter power output via WiFi or other wireless facilities. Next time the user gets in the vehicle 10, the control device 20 can transmit such notification information to the mobile apparatus 50 via the communication section 60.

Further, upon execution of, for example, step S6 of FIG. 5, the control device 20 can transmit notification information corresponding to the second (or lowered) transmitter power output to the mobile apparatus 50 via the communication section 60. The mobile apparatus 50 includes a processing section, a notification section (display section) and an operation section, and the notification section, such as the display section, of the mobile apparatus 50 may promptly display to the user that the first overall transmission area has been lowered to the second overall transmission area. In a case where the display section of the mobile apparatus 50 is in the form of a touch-panel type display, the display section functions also as an operation section of the mobile apparatus 50, and, by operating such an operation section, the user can determine whether the second transmitter power output (set value) should be stored, for example, into the storage section of the control device 20.

For example, the display section of the mobile apparatus 50 can not only display a message in letters like "Is the narrowed communication area to be learned?", but also selection buttons like "Yes" and "No". If the user selects "Yes", the storage section of the control device 20 can store or learn the second transmitter power output (set value). If the user selects "No", on the other hand, the storage section of the control device 20 does not store or learn the second transmitter power output (set value). In this way, the control device 20 can store the second transmitter power output (set value) in accordance with operation information from the operation section of the mobile apparatus 50. An operation section of the navigation device 40 may be used in place of the operation section of the mobile apparatus 50 so that the user can determine whether or not the second transmitter power output (set value) should be stored or learned into the smart entry system 100 next time the user gets in the vehicle.

When steps S2 to S9 of FIG. 5 are not executed, the smart entry system 100 of FIG. 6 may provide the user with notification information corresponding to the first transmitter power output (initial or default value) to be used at step S1. Thus, the user can readily recognize how far away from the vehicle 10 the mobile device 30 should be located.

It should be appreciated that the present invention is not limited to the above-described embodiments and that various modifications thereof are also possible without departing from the spirit so as to cover scope recited in the appended claims, for example.

What is claimed is:

1. A smart entry system that detects whether or not a mobile device is present within a first transmission area set outside of a vehicle, the smart entry system comprising:

a communication section that transmits, with a first cyclic period, a first electromagnetic wave, generating the first transmission area, to outside of the vehicle and receives from the mobile device a response to the first electromagnetic wave; and a control device that determines, based on presence/absence of the response from the mobile device, whether the mobile device is present within the first transmission area, upon determination that the mobile device has continued to be present within the first transmission area for a predetermined time or over, the control device lowers first transmitter power output of the first electromagnetic wave to be transmitted from the communication section to second transmitter power output of the first electromagnetic wave so that the first transmission area is narrowed to a second transmission area until no more response is received from the mobile device, then, the communication section not only transmits the first electromagnetic wave having the second transmitter power output and generating the second transmission area but also transmits, with a second cyclic period longer than the first cyclic period, a second electromagnetic wave, the second electromagnetic wave has the first transmitter power output and generates the first transmission area which is not narrowed, and when no response to the second electromagnetic wave transmitted with the second cyclic period is received from the mobile device, the communication section transmits again, with the first cyclic period, the first electromagnetic wave, the first electromagnetic wave has the first transmitter power output and generates the first transmission area, the first transmitter power output is not lowered and the first transmission area is not narrowed.

2. The smart entry system according to claim 1, the control device stores the second transmitter power output of the first electromagnetic wave, the first electromagnetic wave is transmitted from the communication section and generates the second transmission area narrowed from the first transmitter area.

3. The smart entry system according to claim 2 further comprising:

a position acquisition device that acquires a position of the vehicle, in accordance with the position of the vehicle acquired by the position acquisition device, the control device sets the first transmitter power output of the first electromagnetic wave to be transmitted from the communication section with the first cyclic period, when storing the second transmitter power output of the first electromagnetic wave transmitted from the communication section and generating the second transmission area, the control device further stores the position of the vehicle as a first position, and in a case where the first position is prestored in advance and when a current position of the vehicle matches the first position, the control device sets the second transmitter power output as the first transmitter power output of the first electromagnetic wave to be transmitted from the communication section with the first cyclic period.

4. The smart entry system according to claim 2, the control device stores the second transmitter power output in response to operation information given from an operation section.

5. The smart entry system according to claim 1 further comprising:

a notification section that provides a user with notification information corresponding to the second transmitter power output lowered from the first transmitter power output.

6. The smart entry system according to claim 1 further comprising:

a position acquisition device that acquires a position of the vehicle, in accordance with the position of the vehicle acquired by the position acquisition device, the control device sets the first transmitter power output of the first electromagnetic wave to be transmitted from the communication section with the first cyclic period.

7. A smart entry system that detects whether or not a mobile device is present within a first transmission area set outside of a vehicle, the smart entry system comprising:

a communication section that transmits, with a first cyclic period, a first electromagnetic wave, generating the first transmission area, to outside of the vehicle and receives from the mobile device a response to the first electromagnetic wave;

a control device that determines, based on presence/absence of the response from the mobile device, whether the mobile device is present within the first transmission area; and a position acquisition device that acquires a position where the vehicle is parked, when the position of the vehicle acquired by the position acquisition device is a first position which is prestored in advance in a storage section of the control device, the control device sets first transmitter power output of the first electromagnetic wave to be transmitted from the communication section with the first cyclic period.

8. The smart entry system according to claim 7 further comprising:

a notification section that provides a user with notification information corresponding to the first transmitter power output.

9. The smart entry system according to claim 7, the first transmitter power output is set to a value where there is no response from the mobile device as a default value.

* * * * *